Figures 1, 2:
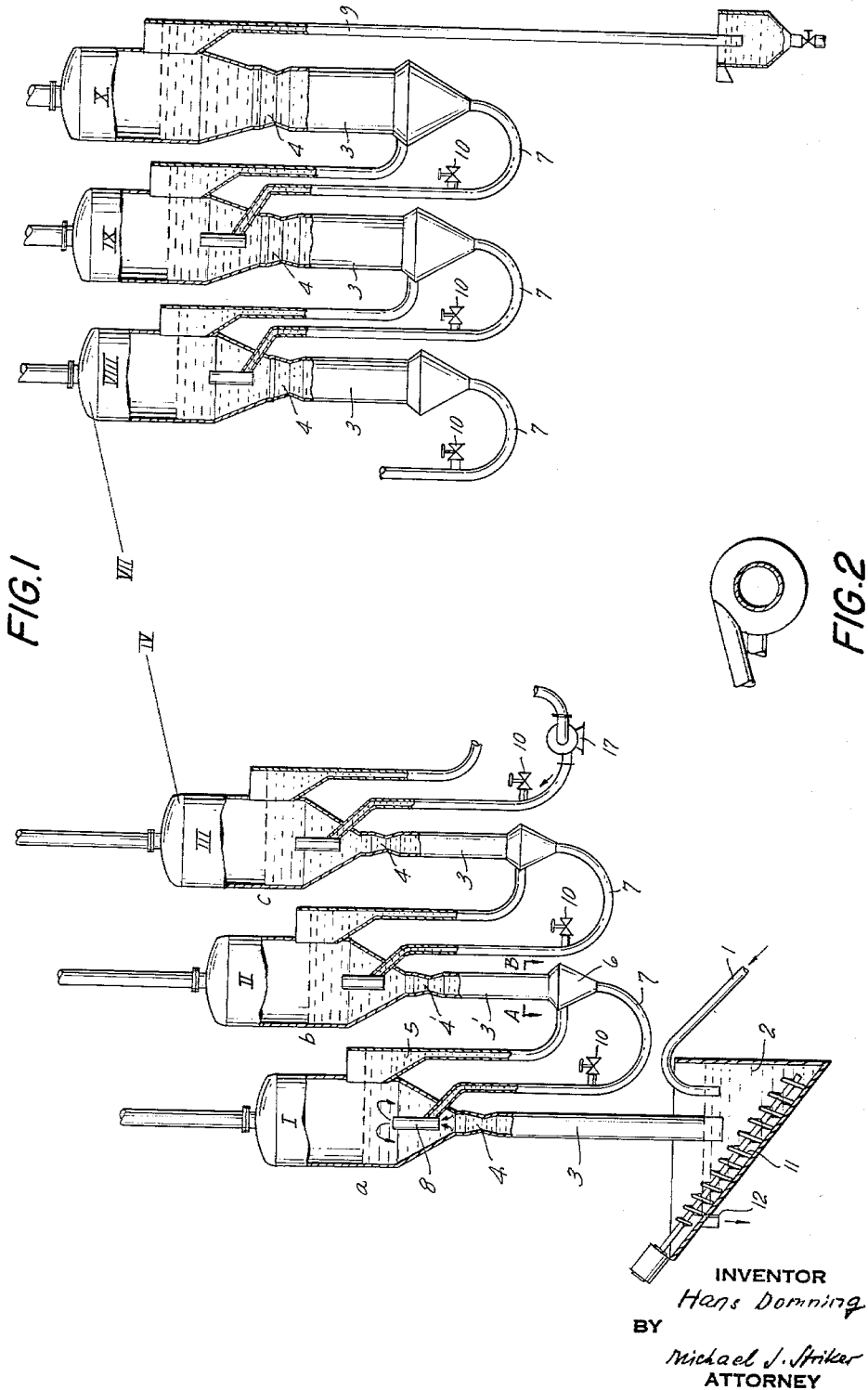

Aug. 24, 1965

H. DOMNING 3,202,487

MULTIPLE EFFECT, GRAVITY CLASSIFICATION
CRYSTALLIZATION METHOD AND APPARATUS
Filed Dec. 8, 1960

INVENTOR
Hans Domning
BY
Michael J. Striker
ATTORNEY

United States Patent Office 3,202,487
Patented Aug. 24, 1965

3,202,487
MULTIPLE EFFECT, GRAVITY CLASSIFICATION CRYSTALLIZATION METHOD AND APPARATUS
Hans Domning, Kassel-Ki., Germany, assignor to Wintershall A.G., Kassel, Germany
Filed Dec. 8, 1960, Ser. No. 74,682
10 Claims. (Cl. 23—295)

The present invention relates to a crystallization process and arrangement, and more particularly, the present invention is concerned with the crystallization of crystallizable materials such as salts from solutions which pass through a series of vacuum evaporators.

Frequently crystallized salts are recovered from solutions thereof by passing such solutions through vacuum evaporation devices in which the solutions are cooled by partial evaporation under conditions of reduced pressure so that corresponding to the increase of salt concentration above the saturation point, salt crystals are formed. Salt or other crystals formed in this manner generally are very fine grained and for this reason present certain difficulties during further bulk processing and/or storage, for instance due to undesirable dust formation or due to caking of the crystal mass.

Various procedures have been proposed in order to increase the size of crystals produced by partial vacuum evaporation of a concentrated solution. It has been tried to carry out crystallization within the area of metastable saturation of the solution whereby, however, it is not possible to prevent completely or to a sufficient degree the formation of additional smaller crystals or crystal seeds. In order to avoid high degrees of supersaturation, multi-stage vacuum evaporation and cooling devices have been proposed in which the temperature gradient from step to step is kept as small as possible.

All the foregoing and other devices and apparatus which have been suggested for the purpose of forming relatively large crystals without accruing an appreciable portion of small crystals, have met only with very limited success and, furthermore, some of these methods are relatively involved and/or require complicated equipment.

According to these prior art methods, the residual solution or mother liquor and the crystals are jointly recovered from the last and coldest stage of the series of vacuum evaporators. Crystals and mother liquor or solution thus move in concurrent flow through the vacuum evaporator arrangement. It follows therefrom that when concentrated solution having previously formed crystals distributed therethrough enters into the next cooler stage of the multistage vacuum evaporation device, first of all, the thus introduced solution will be cooled by evaporation. The crystals carried by the thus cooled solution possess the higher temperature of the preceding stage and are cooled by heat exchange with the surrounding solution. Since the solution and crystal mixture remain in each stage of the multistage vacuum evaporation device for only a limited period of time, the lower temperature corresponding to the lower sub-atmospheric pressure in the respective evaporator will not be reached fully, in other words, the evaporation or boiling off of solution and the consequent cooling of the residual solution will not be fully completed when such evaporated solution with the crystals distributed therethrough passes to the next evaporation stage. Due to the time element involved in the heat exchange between crystals and solution, there will be permanently a temperature differential between the crystals and solution which temperature differential is greater when the concentrated solution with the crystals distributed therethrough enters a given evaporator of the series of vacuum evaporators, than when the material leaves such given evaporator. Due to the continuous heat transfer from the crystals to the surrounding solution, the solution in the immediate vicinity of the crystals will always be somewhat warmer than the solution at a somewhat greater distance from individual crystals. It follows from the above consideration that there will be a greater tendency for crystal formation in the cooler portions of the solution, i.e. in the portions of the solution which are somewhat more distant from individual crystals, and this again will cause in such cooler portions of the solution the formation of new small crystals rather than growth of previously formed crystals which are surrounded by and in direct contact with somewhat warmer solution.

It is therefore an object of the present invention to provide a method and arrangement for vacuum crystallization which will overcome the above discussed difficulties and disadvantages.

It is a further object of the present invention to provide a method and arrangement for vacuum crystallization of salts and other dissolved crystallizable materials whereby a high yield of large crystals, frequently larger crystals than could be obtained up to now by vacuum evaporation, will be formed.

It is yet another object of the present invention to provide a method and device for producing by multiple vacuum evaporation high yields of large crystals in a particularly simple and economical manner.

Other objects and advantages of the present invention will become apparent from a further reading of the description and of the appended claims.

With the above and other objects in view, the present invention comprises in a crystallization process, the steps of successively passing a concentrated solution of a crystallizable material through a plurality of consecutive vacuum evaporation stages in which the crystallizable material containing solution is subjected to succesively lower sub-atmospheric pressures and correspondingly lower temperatures in the direction of passage of the concentrated solution through the vacuum evaporation stages so as to cause partial crystallization of the material in each of the vacuum evaporation stages, passing thus formed crystals in countercurrent flow to the solution from the particular evaporation stage wherein the respective crystals are formed through the preceding vacuum evaporation stages in such a manner that the crystals passing from any one evaporation stage to the immediately preceding evaporation stage reach the latter at a lower temperature than the temperature of the concentrated solution therein, whereby the crystals will cool the concentrated solution surrounding the same so that crystallizable material will transfer from the surrounding solution to the crystals causing growth of the latter, and recovering the thus grown crystals from the first of the plurality of consecutive vacuum evaporation stages.

The present invention also contemplates in a vacuum crystallizing arrangement a series of vacuum evaporators including a first and a last evaporator, the evaporators, respectively, being maintained at consecutively lower sub-atmospheric pressures and correspondingly lower temperatures, means for passing a concentrated solution of a crystallizable material through the series of evaporators in the direction from the first toward the last evaporator, so as to cause crystallization of a portion of the material in the evaporators, respectively, and means for passing at least a portion of the thus formed crystals in countercurrent flow to the solution in the direction from the last to the first evaporator, whereby the crystals will grow during such passage.

Thus, according to the present invention, the concentrated solution and the crystals formed thereof pass for the first time in countercurrent flow to each other through the multistage vacuum evaporation device so that the large crystals leave the apparatus at about the point where fresh and relatively hot solution is introduced into the same. As a result of this countercurrent movement of crystals and solution, the temperature of the crystals while passing from one evaporation stage to the next countercurrently to the solution, will be somewhat lower than the temperature of the contacted solution. It follows that the solution in the immediate vicinity of the crystals will be cooled by contact with the same and thereby the solubility of crystallizable material in the solution next to the crystals will be reduced, causing additional crystallization, however, not in the form of new seed crystals, but by growth of the previously formed cooler crystals. In other words, the tendency for crystallization is enhanced in the layer of the liquid which is immediately adjacent to the surface of the cooler crystals and this will cause growth of the same. Furthermore, combined with the countercurrent flow of crystals and solution, a size classification of the crystals is carried out and it is accomplished that only relatively large crystals having at least a predetermined minimum size will pass in countercurrent flow to the solution from one evaporator to the preceding one while smaller crystals will be prevented from passing countercurrent to the solution and will be retained in the respective evaporator, or will pass from the same together with solution to the succeeding evaporator, until such smaller crystals have grown to the predetermined minimum size required for countercurrent passage. This classification, furthermore, will achieve that the solution in the respective evaporators is enriched with crystals so that supersaturation of the solution due to evaporation of the same will primarily cause growth of the suspended relatively small crystals and not formation of new seeds.

It is a further advantage of the present invention that crystals which are formed in the cooler stages of the multistage evaporation device will have to pass through all preceding stages until they are separated from the relatively hot solution substantially at the point where the hot solution enters the first evaporator. This countercurrent passage favors further growth of the crystals because it increases the length of time individual crystals will remain in the multistage evaporation device and because the speed of crystallization increases with increasing temperature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic fragmentary elevational view of a vacuum crystallizing arrangement, according to the present invention; and FIG. 2 is a cross-sectional view taken along line A–B of FIG. 1.

Referring now to the drawing and at the same time describing the invention by way of examples, it will be seen that the vacuum evaporation and crystallization arrangement comprises a plurality of individual evaporators, preferably between 10 and 15, of which evaporators I–III and VIII–X of an arrangement including ten evaporators, are shown. The individual evaporators are arranged at staggered increasing heights so that the level of liquid within the individual evaporators will be higher in the direction from evaporator I to evaporator X, corresponding to the progressive reduction in pressure within the individual evaporators.

The hot solution enters through conduit 1 into vessel 21, due to the sub-atmospheric pressure in evaporator I, the solution will be drawn upwardly through pipe 3 into evaporator I up to the level $a$ and will be cooled in evaporator I due to evaporation of a portion of the solution. The thus cooled solution then flows through conduit 5 into the conically shaped leg 6 of evaporator II and is sucked through pipe 3' into the body of evaporator II up to the level $b$. In evaporator II cooling of the solution takes place corresponding to the reduction of boiling temperature of the solution which again corresponds to the decrease of pressure between evaporators I and II, which is also shown by the difference in height between levels $a$ and $b$. This flow of the solution continues through the successive evaporators III–X and the liquid then leaves the last stage of the evaporation arrangement, i.e. evaporator X through conduit 9.

For instance, when it is desired to produce coarse grained potassium salt fertilizer crystals from a suitable solution, the solution will enter suction vessel 2 through conduit 1 at a temperature of about 93° C. In suction vessel 2, the solution will have a composition of:

| | G./liter |
|---|---|
| KCl | 161 |
| $MgCl_2$ | 180 |
| $MgSO_4$ | 60 |
| NaCl | 102 |
| $H_2O$ | 789 |

At this point, the specific weight of the solution is 1.292.

Due to the sub-atmospheric pressure in evaporator I, the solution will be drawn into evaporator I up to the level $a$ and will cool thereby due to evaporation by about 6.3° C. Subsequent cooling in each of the successive stages will amount to 6.3° C., so that the solution leaving the apparatus after passing through evaporator X will have a temperature of 30° C. The composition of the solution leaving evaporator X is:

| | G./liter |
|---|---|
| KCl | 74 |
| $MgCl_2$ | 210 |
| $MgSO_4$ | 59 |
| NaCl | 65 |
| $H_2O$ | 876 | and the specific weight of this solution is 1.284.

Riser pipes 3, and particularly the portions 4 of restricted cross sectional area are so dimensioned that for a given quantity of solution passing through the entire evaporation arrangement, the speed of flow through portions 4 will be reduced in the direction from evaporator I towards evaporator X. Thereby, it will be accomplished that small crystals which, for instance, were formed in evaporator I can be carried along with the flowing solution until in one of the portions 4 the speed of flow of the upwardly moving solution will become smaller than the downward gravitational speed of the smaller crystals in the evaporator above the respective portion 4.

For instance, riser pipes 3 and portions of reduced cross sectional area 4 will be so dimensioned for the passage of 10 cubic meters per hour of solution that the cross sectional area 4 underneath evaporator I will have a diameter of 264 mm. (and, of course, circular configuration). The diameters of portions 4 will become larger in the direction towards evaporator X, and the diameter of the portion of reduced cross section 4 associated with evaporator X will be 500 mm.

The crystals formed in the individual evaporators and having a sufficiently large size to flow downwardly through reduced portions 4 of riser pipes 3, in counter-current flow to the solution, will pass through conduit 7 into the preceding evaporation stage which, as has been discussed further above, will possess a somewhat higher temperature. Thus, for instance, such relatively larger crystals will pass countercurrent to the solution from evaporator III to evaporator II. The two frustoconical portions which form the lower end of riser 3 will facilitate entry of solution from conduit 5 into riser pipe 3 while simultaneously allowing for further downward passage of crystals into conduit 7.

The crystals which thus have passed from evaporator III to evaporator II will remain suspended in evaporator II until they have grown sufficiently to pass in countercurrent flow to the solution through the portion 4' of reduced cross section associated with evaporator II. Since the cross section of 4' associated with evaporator II is smaller than the cross section of portion 4 associated with evaporator III, the upward speed of flow of solution through portion 4' will be greater and thus the crystals will have to grow in evaporator II beyond the size to which they had to grow in evaporator III, in order to be able to pass in countercurrent to the faster upwardly flowing solution through pipe portion 4'.

This process which has been described with respect to movement between evaporators III to II takes place between adjacent evaporators from evaporator X to evaporator I, in other words, until the crystals have grown in evaporator I to such a size that they will flow downwardly countercurrent to the solution passing through the riser pipe 3 and portion of reduced cross section 4 which are associated with evaporator I, to collect in the lower portion of suction vessel 2. The crystals which in this manner collect in the lower portion of suction vessel 2 are of substantially uniform grain size. For instance, under the conditions described hereinabove, the size distribution of the crystals was found to be as follows:

| | Percent |
|---|---|
| Over 1 mm. | 1 |
| 0.75–1 mm. | 47 |
| 0.5–0.75 mm. | 38 |
| 0.4–0.5 mm. | 10 |
| 0.3–0.4 mm. | 2 |
| 0.2–0.3 mm. | 1 |
| 0.1–0.2 mm. | 0.5 |
| Under 0.1 mm. | 0.5 |

The chemical composition of the crystals collecting under such conditions in vessel 2 was:

| | Percent |
|---|---|
| KCl | 63.9 |
| NaCl | 34.24 |
| $MgSO_4$ | 1.2 |
| $MgCl_2$ | 0.66 |

Thus the size index of the crystals according to Rosin-Rammler was about 0.8 mm. The method of determining the size index of the crystal mass is, for instance, fully described in Winnacker-Küchler, Chemische Technologie, Vol. 1, Anorganische Technologie I, 2nd edition, 1958, pages 61–67.

The crystals collecting in the lower portion of suction vessel 2 are then removed by means of screw conveyor 11 and outlet opening 12.

Movement of the crystals through the upwardly extending leg of conduit 7 into the preceding evaporator is accomplished by means of a portion of the solution which continuously circulates between adjacent evaporators, for instance, from evaporator I through conduit 5 into the conical leg portion 6 of riser 4' and from there through conduit 7 back into evaporator I. This circular flow of a portion of the solution can be maintained by allowing a certain amount of air to be sucked into conduit 7 by means of valve 10. However, as illustrated in connection with evaporator III, it is also possible to use in place of air a mechanical pump 17 located in the lowermost portion of conduit 7 for accomplishing the circular flow of a portion of the solution and thus the movement of crystals into the preceding evaporator. The amount of air which is needed for maintaining this circular flow is relatively small, due to the fact that the crystals are to reach eventually (in evaporator I) a height which is below the height from which the crystals have passed downwardly (in evaporator II), so that in the end effect no lifting of the crystals is required. The mixture of conveying air, solution and crystals is introduced through pipe 8 into the preceding evaporator, and thereby creates circulation of liquid within the evaporator so that the introduced crystals will be evenly distributed within the same.

The amount of air thus required will be between 1–4 cubic meters per hour depending on the degree of subatmospheric pressure in the respective evaporator, in accordance with the specific conditions described hereinabove. This amount of air will suffice to circulate between one and three times the amount of solution which during the same time effectively flows from one evaporator to the next. Under the conditions described, about 1200 kg. of crystals per hour are obtained and withdrawn through opening 12.

The initial solution which is introduced through conduit 1, in the above described case, is a so-called hard salt solution of the type produced in the recovery of natural potassium salt deposits. Such hard salt is a mixture of sylvine (KCl 10–25%), rock salt (NaCl, 30–75%), and kieserit ($MgSO_4.H_2$, 8–50%).

When working up identical hard salt solutions in conventional multiple vacuum evaporation devices which operate with concurrent flow of solution and crystals, a crystal mixture will be obtained which possesses only the following grain size distribution:

| | Percent |
|---|---|
| 0.5–1 mm. | 1 |
| 0.3–0.5 mm. | 3.5 |
| 0.2–0.3 mm. | 10.0 |
| 0.1–0.2 mm. | 44.5 |
| 0.06–0.1 mm. | 32.0 |
| Under 0.06 mm. | 9.0 |

The grain size index according to Rosin-Rammler in this case will be only between 0.15 mm. and 0.2 mm., as compared with about 0.8 mm. when operating in accordance with the present invention.

Thus, according to the present invention, it is possible to obtain a mass consisting of much larger crystals in a simpler and economical manner by following the method described above and utilizing the apparatus illustrated and described herein.

In vacuum evaporation and cooling devices of conventional construction, the concentration of crystals in the solution is considerably smaller than according to the present invention. Due to the fact that the relative amount of crystals increases with progressive cooling and this in the direction of flow of the solution, the crystal concentration in the first stages must be relatively small. Even in the coldest stage, only as much salt as can be suspended in the solution as can be crystallized based on the total cooling differential.

It has been attempted to improve these unfavorable conditions prevailing according to prior art processes by distributing the crystals as evenly as possible in the solution, for instance, by stirring, or to increase the crystal concentration artificially by seeding at various stages of the evaporation process. However, no appreciable improvement of the grain size distribution could be accomplished in this manner.

In contrast thereto, according to the present invention, a portion of the solution will circulate with the crystals which pass in countedcurrent flow to the main portion of the solution. Depending on the relative amount of solution which is thus circulated, the temperature differential between adjacent stages can be reduced to such an extent that the solution in each of the successive stages, due to the cooling therein, will be primarily in a condition of metastable saturation.

However, practical limitations will make it hardly possible to prevent that the solution leaving the last stage, i.e. evaporator X, according to the described example, will still contain a small amount of relatively fine grain crystals. These fine grain crystals are preferably separated from the solution in which they are suspended and are then introduced into evaporator I, for instance, by being introduced into suction vessel 2. These fine crystals serve for saturating the hot solution which for practical reasons cannot be completely saturated previously, prior to introduction of the hot solution into evaporator I. The portion of the fine crystals which will not be thus dissolved, will serve as seed crystals in evaporator I.

It will be understood that each of the elements described above, or two or more together, may also find a useful application in other types of evaporating devices differing from the types described above.

While the invention has been illustrated and described as embodied in a multiple stage vacuum crystallizing device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a crystallization process, the steps of passing through a plurality of consecutive treatment stages maintained at progressively decreasing temperatures a stream of a concentrated aqueous of crystallizable material the solubility of which in said aqueous progressively decreases at the progressively decreasing temperatures maintained in said consecutive treatment stages so as to cause in each of said treatment stages formation of small crystals which upon passage into the following treatment stages will increase in size so as to form larger crystals, said stream of concentrated aqueous being moved in upward direction at each of said consecutive treatment stages at a speed smaller than the speed at the preceding treatment stage so as to form at each treatment stage an upwardly directed stream portion moving upwardly at a speed which is smaller than the speed of upward movement at the preceding treatment stage but greater than the speed of upward movement at the following treatment stage so that at each of said treatment stages the size of said larger crystals which will be adapted to move downwardly in said upwardly directed stream due to their weight will be greater than the size of downwardly moving larger crystals in the upwardly directed stream of the following and smaller than at the preceding treatment stage; reintroducing said downwardly moving larger crystals from each of said treatment stages into the immediate preceding treatment stage at a point located upwardly of said upwardly directed stream portion in which said thus reintroduced larger crystals due to their larger size will also move downwardly in a direction opposite to the flow of the respective upwardly directed stream portion thereby further increasing in size; and repeating said reintroduction of larger crystals from any treatment stage into the preceding treatment stage at a point located above said upwardly directed stream portion until substantially all of said larger crystals while growing larger are accumulating at a point of the first one of said consecutive treating stages located below said upwardly directed stream portion thereof.

2. In a process of recovering potassium chloride from a solution containing the same, the steps of passing through a plurality of consecutive treatment stages maintained at progressively decreasing temperatures, a stream of a concentrated aqueous of crystallizable material including potassium chloride the solubility of which in said aqueous progressively decreases at the progressively decreasing temperatures maintained in said consecutive treatment stages so as to cause in each of said treatment stages formation of small crystals of potassium chloride which upon passage into the following treatment stages will increase in size so as to form larger crystals of potassium chloride, said stream of concentrated aqueous being moved in upward direction at each of said consecutive treatment stages at a speed smaller than the speed at the preceding treatment stage so as to form at each treatment stage an upwardly directed stream portion moving upwardly a speed which is smaller than the speed of upward movement at the preceding treatment stage but greater than the speed of upward movement at the following treatment stage so that at each of said treatment stages the size of said larger crystals which will be adapted to move downwardy in said upwardly directed stream due to their weight will be greater than the size of downwardly moving larger crystals in the upwardly directed stream of the following and smaller than at the preceding treatment stage; reintroducing said downwardly moving larger crystals from each of said treatment stages into the immediate preceding treatment stage at a point located upwardly of said upwardly directed stream portion in which said thus reintroduced larger crystals due to their larger size will also move downwardly in a direction opposite to the flow of the respective upwardly directed stream portion thereby further increasing in size; and repeating said reintroduction of larger crystals from any treatment stage into the preceding treatment stage at a point located above said upwardly directed stream portion until substantially all of said larger crystals while growing larger are accumulating at a point of the first one of said consecutive treating stages located below said upwardly directed stream portion thereof.

3. In a process of recovering potassium salts from solutions containing the same, the steps of passing through a plurality of consecutive treatment stages maintained at progressively decreasing temperatures, a stream of concentrated aqueous of crystallizable material including potassium salts the solubility of which in said aqueous progressively decreases at the progressively decreasing temperatures maintained in said consecutive treatment stages so as to cause in each of said treatment stages formation of small crystals potassium salt which upon passage into the following treatment stages will increase in size so as to form larger crystals potassium salt, said stream of concentrated aqueous being moved in upward direction at each of said consecutive treatment stages at a speed smaller than the speed at the preceding treatment stage so as to form at each treatment stage an upwardly directed stream portion moving upwardly at a speed which is smaller than the speed of upward movement at the preceding treatment stage but greater than the speed of upward movement at the following treatment stage so that at each of said treatment stages the size of said larger crystals which will be adapted to move downwardly in said upwardly directed stream due to their weight will be greater than the size of downwardly moving larger crystals in the upwardly directed stream of the following and smaller than at the preceding treatment stage; reintroducing said downwardly moving larger crystals from each of said treatment stages into the immediate preceding treatment stage at the immediate point located upwardly of said upwardly directed stream portion in which said thus reintroduced larger crystals due to their larger size will also move downwardly in a direction opposite to the flow of the respective upwardly directed stream portion thereby further increasing in size; and repeating said reintroduction of larger crystals from any treatment stage into the preceding treatment stage at a point located above said upwardly directed stream portion until substantially all of said larger crystals while growing larger are accumulating at a point of the first one of said consecutive treating stages located below said upwardly directed stream portion thereof.

4. In a vacuum crystallization process, the steps of successively passing a stream of concentrated aqueous of a crystallizable material, the solubility of which in said aqueous progressively decreases with progressively decreasing temperatures, through a plurality of consecutive vacuum evaporation stages in which said crystallizable material-containing aqueous is subjected to progressively lower temperatures and sub-atmospheric pressures so as to cause in each of said vacuum evaporation stages partial crystallization of said material thereby forming small crystals which upon passage into the following vacuum evaporation stages will increase in size so as to form larger crystals, the thus-formed stream of small crystals-containing concentrated aqueous being moved in upward direction at each of said consecutive vacuum evaporation stages at a speed smaller than the speed at the preceding treatment stage so as to form at each vacuum evaporation stage an upwardly directed stream portion moving upwardly at a speed which is smaller than the speed of upward movement at the preceding treatment stage but greater than the speed of upward movement at the following treatment stage so that at each of said treatment stages the size of only said larger crystals which will be adapted to move downwardly in said upwardly directed stream will be greater than the size of downwardly moving larger crystals in the upwardly directed stream of the following and smaller than at the preceding treatment stage; reintroducing said downwardly moving larger crystals from each of said vacuum evaporation stages into the immediate preceding vacuum evaporation stage at a point located upwardly of the upwardly directed stream portion thereof the thus reintroduced larger crystals due to their larger size moving downwardly in said upwardly directed stream portion in a direction opposite to the flow of the respective upwardly directed stream portion thereby further increasing in size; and repeating said reintroduction of larger crystals from any vacuum evaporation stage into the preceding vacuum evaporation stage at a point located above the respective upwardly directed stream portion so as to accumulate said larger crystals, while the same are further growing, at a point of the first one of said consectuive vacuum evaporation stages located below said upwardly directed stream portion thereof.

5. In a vacuum crystallization process, the steps of successively passing a stream of concentrated aqueous of a crystallizable material, the solubility of which in said aqueous progressively decreases with progressively decreasing temperatures, through a plurality of consecutive vacuum evaporation stages in which said crystallizable material-containing aqueous is subjected to progressively lower temperatures and sub-atmospheric pressures so as to cause in each of said vacuum evaporation stages partial crystallization of said material thereby forming small crystals which upon passage into the following vacuum evaporation stages will increase in size so as to form larger crystals, the thus-formed stream of small crystals-containing concentrated aqueous being moved in upward direction at each of said consecutive vacuum evaporation stages at a speed smaller than the speed at the preceding treatment stage so as to form at each vacuum evaporation stage an upwardly directed stream portion moving upwardly at a speed which is smaller than the speed of upward movement at the preceding treatment stage but greater than the speed of upward movement at the following treatment stage so that at each of said treatment stages the size of only said larger crystals which will be adapted to move downwardly in said upwardly directed stream will be greater than the size of downwardly moving larger crystals in the upwardly directed stream of the following and smaller than at the preceding treatment stage; reintroducing said downwardly moving larger crystals from each of said vacuum evaporation stages into the immediate preceding vacuum evaporation stage at a point located upwardly of the upwardly directed stream portion thereof, the thus introduced larger crystals due to their larger size reaching said preceding vacuum evaporation stage at a lower temperature than the temperature of the concentrated solution therein so as to cool the concentrated solution surrounding said introduced larger crystals thereby reducing the solubility of the crystallizable material in said solution and causing transfer of crystallizable material from the surrounding solution to said larger crystals, the thus further growing larger crystals moving downwardly in said upwardly directed stream portion in a direction opposite to the flow thereof; and repeating said reintroduction of larger crystals from any vacuum evaporation stage into the preceding vacuum evaporation stage at a point located above the respective upwardly directed stream portion so as to accumulate said larger crystals, while the same are further growing, at a point of the first one of said consecutive vacuum evaporation stages located below said upwardly directed stream portion thereof.

6. In a vacuum crystallization process, the steps of successively passing a stream of concentrated aqueous of a crystallizable material, the solubility of which in said aqueous progressively decreases with progressively decreasing temperatures, through a plurality of consecutive vacuum evaporation stages in which said crystallizable material-containing aqueous is subjected to progressively lower temperatures and sub-atmospheric pressures so as to cause in each of said vacuum evaporation stages partial crystallization of said material thereby forming small crystals a portion of which upon passage into the following vacuum evaporation stages will increase in size so as to form larger crystals, the thus-formed stream of small crystals-containing concentrated aqueous being moved in upward direction at each of said consecutive vacuum evaporation stages at a speed smaller than the speed at the preceding treatment stage so as to form at each vacuum evaporation stage an upwardly directed stream portion moving upwardly at a speed which is smaller than the speed of upward movement at the preceding treatment stage but greater than the speed of upward movement at the following treatment stage so that at each of said treatment stages the size of only said larger crystals which will be adapted to move downwardly in said upwardly directed stream will be greater than the size of downwardly moving larger crystals in the upwardly directed stream of the following and smaller than at the preceding treatment stage while the smaller of said crystals will continue to flow with said concentrated solution towards the last of said consecutive vacuum evaporation stages; reintroducing said downwardly moving larger crystals from each of said vacuum evaporation stages into the immediate preceding vacuum evaporation stages at a point located upwardly of the upwardly directed stream portion thereof the thus reintroduced larger crystals due to their larger size moving downwardly in said upwardly directed stream portion in a direction opposite to the flow of the respective upwardly directed stream portion thereby further increasing in size; repeating said reintroduction of larger crystals from any vacuum evaporation stage into the preceding vacuum evaporation stage at a point located above the respective upwardly directed stream portion so as to accumulate said larger crystals, while the same are further growing, at a point of the first one of said consecutive vacuum evaporation stages located below said upwardly directed stream portion thereof; and recovering said smaller crystals from said last of said vacuum evaporation stages.

7. In a vacuum crystallization process, the steps of successively passing a stream of concentrated aqueous of a crystallizable material, the solubility of which in said aqueous progressively decreases with progressively decreasing temperatures, through a plurality of consecutive vacuum evaporation stages in which said crystallizable material-containing aqueous is subjected to progressively lower temperatures and sub-atmospheric pressures so as to cause in each of said vacuum evaporation stages partial crystallization of said material thereby forming small crystals a portion of which upon passage into the following vacuum evaporation stages will increase in size so as to form larger crystals, the thus-formed stream of small crystals-containing concentrated aqueous being moved in upward direction at each of said consecutive vacuum evaporation stages so as to form at each vacuum evaporation stage an upwardly directed stream portion moving upwardly at a speed which is smaller than the speed of upward movement at the preceding treatment stage but greater than the speed of upward movement at the following treatment stage so that at each of said treatment stages the size of only said larger crystals which will be adapted to move downwardly in said upwardly directed stream will be greater than the size of downwardly moving larger crystals in the upwardly directed stream of the following and smaller than at the preceding treatment stage while the smaller of said crystals will continue to flow with said concentrated solution towards the last of said consecutive vacuum evaporation stages; reintroducing said downwardly moving larger crystals from each of said vacuum evaporation stages into the immediate preceding vacuum evaporation stage at a point located upwardly of the upwardly directed stream portion thereof the thus reintroduced larger crystals due to their larger size moving downwardly in said upwardly directed stream portion in a direction opposite to the flow of the respective upwardly directed stream portion thereby further increasing in size; repeating said reintroduction of larger crystals from any vacuum evaporation stage into the preceding vacuum evaporation stage at a point located above the respective upwardly directed stream portion so as to accumulate said larger crystals, while the same are further growing, at a point of the first one of said consecutive vacuum evaporation stages located below said upwardly directed stream portion thereof; recovering said smaller crystals from said last of said vacuum evaporation stages; and introducing at least a portion of the thus recovered smaller crystals as seed crystals into the first of said plurality of conesecutive vacuum evaporation stages.

8. A vacuum crystallizing arrangement, comprising, in combination, a series of vacuum evaporators including a first and last evaporator arranged in an upwardly staggered relationship in the direction from said first toward said last evaporator, said evaporators, respectively, being maintained at consecutively lower sub-atmospheric pressures and correspondingly lower temperatures and arranged stepwise, in upwardly increased levels from said first towards said last evaporator, the height differential between adjacent evaporators corresponding to the pressure differential between the same so as to allow drawing liquid through said evaporators in the direction towards said last of said series of evaporators; conduit means for passing a concentrated solution of crystallizable material upwardly through said series of evaporators in the direction from said first toward said last evaporator, so as to cause crystallization of a portion of said material in said evaporators, respectively, forming therein larger and smaller crystals, said conduit means between each two successive evaporators including at least one upwardly extending conduit portion having such cross-sectional dimension that the upward speed of flow of said solution of crystallizable material will be so high as to permit downward passage of only larger crystals which exceed a predetermined minimum size thus separating downwardly passing crystals exceeding said predetermined size from crystals of smaller size which will continue to flow with said stream of concentrated solution said upwardly extending conduit portions being in direction of flow from said first to said last evaporator of progressively increasing cross sectional dimension, whereby the predetermined minimum size of larger crystals which are permitted to pass downwardly through said upwardly extending conduit portions will progressively increase in direction from said last to said first evaporator; and means associated with each of said upwardly extending conduit portions for introducing the therein downwardly passing larger crystals into the preceding evaporator at a point located above the preceding upwardly extending conduit portion leading to said preceding evaporator.

9. A vacuum crystallizing arrangement as defined in claim 8, and including means for withdrawing and separating crystals of less than said predetermined size from the last of said evaporators.

10. A vacuum crystallizing arrangement as defined in claim 9, and including means for introducing at least a portion of said separated crystals of less than said predetermined size into said first evaporator to serve as seed crystals therein.

References Cited by the Examiner

UNITED STATES PATENTS

| | | | |
|---|---|---|---|
| 1,216,187 | 2/17 | Trump | 23—273 |
| 1,873,251 | 8/32 | Allen | 23—273 |
| 1,988,763 | 1/35 | Walter | 23—273 |
| 2,207,347 | 7/40 | Hughes | 159—45 |
| 2,330,221 | 9/43 | Kermer | 23—295 |
| 2,347,073 | 4/44 | Beekhuis | 23—301 |
| 2,384,747 | 9/45 | Hughes | 159—45 |
| 2,631,926 | 3/53 | Eckstrom | 23—273 |
| 2,708,517 | 5/55 | Evans | 209—158 |
| 2,883,273 | 4/59 | Saeman | 23—273 XR |

OTHER REFERENCES

Perry Chemical Engineers Handbook, 2nd edition, McGraw-Hill Book Co., New York & London, 1941, pages 1793 and 1794.

Weissberger Technique of Organic Chemistry, second edition 1956, Interscience Publishers, New York, Vol. III, pages 482, 512 and 513.

Weissburger Techniques of Organic Chemistry, 1956, 2nd edition, part I, pages 398 to 409, 433 to 439.

NORMAN YUDKOFF, *Primary Examiner.*

ANTHONY SCIAMANNA, MAURICE A. BRINDISI, *Examiners.*